United States Patent
Huebler et al.

(10) Patent No.: US 6,559,391 B2
(45) Date of Patent: May 6, 2003

(54) METHOD FOR CONTROLLING A FAST DYNAMIC SCALE

(75) Inventors: Uwe Huebler, Neuenhagen (DE); Christoph Kunde, Berlin (DE)

(73) Assignee: Francotyp-Postalia AG & Co. KG, Birkenwerder (DE)

( * ) Notice: Subject to any disclaimer, the term of this patent is extended or adjusted under 35 U.S.C. 154(b) by 50 days.

(21) Appl. No.: 09/948,840

(22) Filed: Sep. 7, 2001

(65) Prior Publication Data

US 2002/0040260 A1 Apr. 4, 2002

(30) Foreign Application Priority Data

Sep. 13, 2000 (DE) .......................................... 100 46 205

(51) Int. Cl.⁷ .............................................. G01G 19/40
(52) U.S. Cl. .................... 177/25.15; 705/414; 705/415; 177/121; 177/145
(58) Field of Search ............................. 177/25.13, 25.15, 177/119, 120, 121, 125, 145; 705/407, 414, 415, 416

(56) References Cited

U.S. PATENT DOCUMENTS

| | | | |
|---|---|---|---|
| 3,436,968 A | 4/1969 | Unger et al. ............. 177/210 R |
| 3,904,946 A | 9/1975 | Dlugos et al. .............. 318/685 |
| 5,230,391 A | * 7/1993 | Murata et al. ................ 177/50 |
| 5,635,679 A | * 6/1997 | Kohashi et al. .......... 177/25.13 |
| 5,723,825 A | 3/1998 | Dolan et al. ................. 177/145 |
| 5,990,422 A | * 11/1999 | Komori et al. .......... 177/25.11 |
| 6,169,978 B1 | 1/2001 | Lutz et al. ................... 705/406 |
| 6,353,192 B1 | * 3/2002 | Thiel ......................... 177/25.15 |
| 6,472,616 B2 | * 10/2002 | Thiel ......................... 177/25.13 |

FOREIGN PATENT DOCUMENTS

| | | |
|---|---|---|
| DE | 27 17 721 | 10/1978 |
| DE | 198 58 229 | 6/2000 |
| DE | 198 60 295 | 6/2000 |
| DE | 200 01 150 | 7/2000 |
| EP | 0 514 107 | 11/1992 |
| EP | 0 871 145 | 10/1998 |
| EP | 1 014 050 | 11/1999 |

* cited by examiner

Primary Examiner—Randy W. Gibson
(74) Attorney, Agent, or Firm—Schiff Hardin & Waite

(57) ABSTRACT

In a method for the control of a fast dynamic scale a first operating mode controls the transport device for transport of postal matter to a further processing station, a measurement with a weighing cell during the transport is made and an evaluation of the measured values with the letter format microprocessor for the weight determination given dynamic weighing, and weighed values are supplied to the further processing station. An automatic switching into a second operating mode for the semi-dynamic operation of the scale with static weighing ensues dependent on the result of a determination of the dimensions of the following piece of mail in a first processing station arranged upstream in the mail stream.

14 Claims, 5 Drawing Sheets

METHOD FOR CONTROLLING A FAST DYNAMIC SCALE

BACKGROUND OF THE INVENTION

1. Field of the Invention

The present invention is directed to a method for controlling a fast dynamic scale, particularly suited for fast mixed mail processing in a mail processing system with a dynamic scale and postage-calculating postage meter machine, or with dynamic postage-computing scales and franking devices.

2. Description of the Prior Art

European Application 1 014 050 discloses a method and an arrangement for controlling a dynamic scale that can process mixed mail of different sizes and thicknesses and that can be operated in at least two operating modes, wherein the postal items subsequently pass through a further processing station. The dynamic operating mode is adapted to pieces of mail in a special way, so that there is a high probability of being successfully dynamically weighed. The static operating mode of semi-dynamic weighing begins only after an unsuccessful dynamic weighing.

German Published Application 198 60 295 discloses a method for controlling a dynamic scale, wherein the transport speed of the pieces of mail can be increased in certain operating modes by modifying operating parameters of the dynamic scale. The operating modes are selected by the user via a user interface of a connected postage meter machine. The selection is based on the composition of the stack of letters to be processed. The user knows the composition or can estimate it on the basis of empirical values. However, the advantage of the higher transport speed is lost in the case of an incorrect estimate due to a switching to a reduced transport speed during the dynamic weighing, a re-measurement (if needed) or, given "true" mixed mail, due to the operating mode that has been set. "Mixed mail" means an unsorted stack of postal items.

According to European Patent 514 107 a control unit interrupts the transport of pieces of mail that cannot be dynamically weighed until the measurement is stable. A detector, that only allows letters to pass for which the weight has been identified, is arranged in the scale close to the downstream end of the conveyor belt. Measurement errors also occur in the semi-dynamic weighing given a non-uniformly distributed mass in the letter and a high transport speed. A stop for the semi-dynamic weighing on the weighing platform couples oscillations into the system again, and this lengthens the measuring time. Such a stop, moreover, can cause the letter to skid from the weighing pan due to its mass moment of inertia. The dimensions of the weighing pan are therefore designed somewhat larger, or the transport speed is set lower, which reduces the throughput given mixed mail.

The maximum clock performance in a dynamic scale is achieved in the non-weighing mode since the transport velocity is increased and the spacing between the pieces of mail can be minimized. In contrast to mixed mail processing, the stack of postal items must be pre-sorted. When this is not assured individual pieces of mail from the stack of postal items can be ejected after a dynamic weighing.

German Published Application 198 58 229 discloses a method for receiving and sorting mail that implements a weight check in relation to the volume of the postal item and rejects inadmissible postal items.

German Published Application 27 17 721 already discloses a system for franking mail shipments having a shunt that is arranged downstream following a dynamic scale. A conveyor device hands the mailing over to the shunt. The mailing is transferred out at the shunt if it exhibits an abnormal weight value. Given a normal weight value, the conveyor device of the shunt conveys the mail items farther to the postage meter machine. A high clock performance of up to 66% of the maximum clock performance is achieved in this way. However, the pieces of mail that have been sorted out are not weighed.

If it is desired that there be no unweighed pieces of mail that have been transferred out, then either an arrangement for semi-dynamic weighing with a stoppage for weighing (U.S. Pat. No. 3,904,946) or a postal matter handling machine with dynamic adaptation of the transport speed for weighing according to the thickness or size of the piece of mail (European Patent 376 481) must be provided. Alternatively, an arrangement for controlling a dynamic scale conveyor system with a dynamic re-weighing (German Utility Model 20001150) can be provided. An adaptation of the transport speed for dynamic weighing or a dynamic re-weighing do not always prove successful. Due to large dimensions (format, thickness) of pieces of mail and, in particular, of pieces of mail having a non-uniform thickness profile, there are pieces of mail for which the prospect of being successfully dynamically weighed is slight. Semi-dynamic weighing comprises a static weighing following an unsuccessful dynamic weighing. The aforementioned times of two weighing operations add to an overall time, i.e., the measuring time for the dynamic weighing, and the time for the stoppage and the static weighing are required in order to obtain a stable measured value.

SUMMARY OF THE INVENTION

An object of the present invention is to provide a method for controlling a scale for weighing postal items wherein the weight data can be made available to a further processing station, downstream from the scale in the mail flow, in a more rapid manner than in currently available systems.

The above object is achieved in accordance with the invention in a method wherein the scale is operable in a first mode for dynamic weighing and in a second mode for static weighing, wherein a dimensional characteristic of a postal item to be weighed is determined in a processing station separate from and preceding the scale in the mail flow, with the postal item being conveyed from the processing station to the scale via a transport device, and wherein the scale is automatically set to operate in either the first mode or the second mode dependent on the determined dimensional characteristic.

The invention proceeds on the basis of an early automatic switch in the operating mode. By identifying and evaluating dimensions in a processing station arranged upstream, it is predicted, before the actual weighing event, whether a dynamic or static weighing must be implemented. The times for an unnecessary dynamic weighing and for the transient behavior to subside following the dynamic weighing given a return motion and stoppage are eliminated given dynamic weighing. A shorter transiency for the static weighing and a stoppage of the transport motion occur when the piece of mail moves onto the weighing pan of the dynamic scale. A reverse motion of the piece of mail is not required. The times for a dynamic re-weighing and for a reverse motion are eliminated in the dynamic weighing. A shortening of the overall time is achieved therefrom, and the scale can make the data available to the postage meter machine earlier.

A determination is made in the aforementioned evaluation as to whether the values permitted for a dynamic weighing are exceeded by one of the dimensions or with respect to an allowed thickness profile. An evaluation of the thickness profile of the piece of mail leads to a determination as to whether pieces of mail whose thickness still lies within the range of dynamic weighability could have such an unfavorable weight distribution that results in the expectation of an uncertain weighing result, for example given a position of the center of gravity at the periphery of the piece of mail.

DESCRIPTION OF THE PREFERRED EMBODIMENTS

Figure 1:
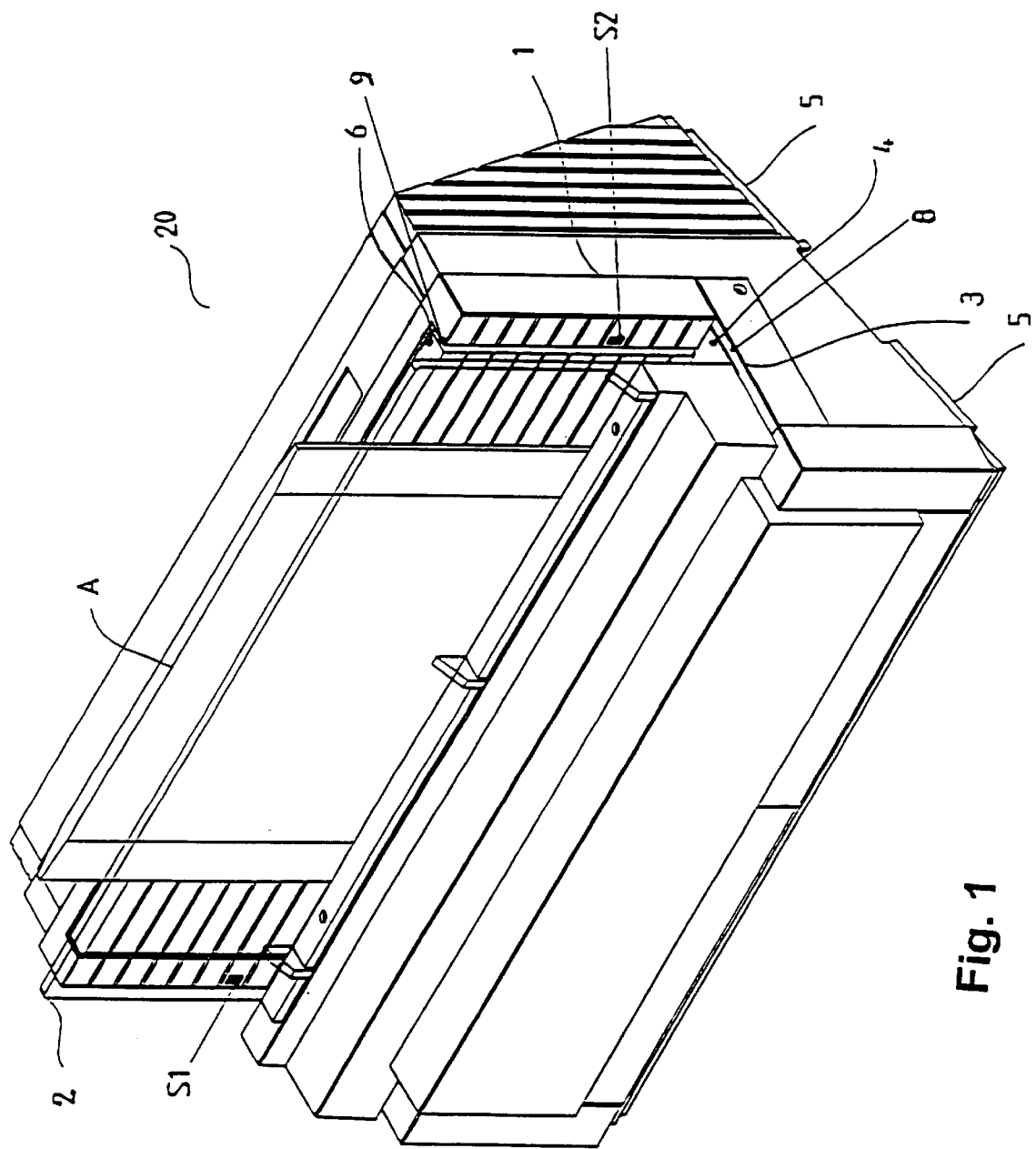
FIG. 1 is a perspective view of a dynamic scale from the right front constructed and operating in accordance with the invention.

FIG. 1 shows a perspective view of a dynamic scale 20 that is designed for the transport of letters or pieces of mail A standing on edge. The letters A lie against a weighing pan 6 that is arranged in a recess 9 in a back guide wall 1 of the scale. Sensors S1 and S2 are arranged in the back guide wall 1 at both sides of the recess 9 for the weighing pan 6. A transport device 4 with a conveyor belt that is deflected under the sensors S1 and S2 lies at the level of the lower guide wall 3 of the scale. The back guide wall 1 is inclined slightly toward the back, preferably by 18° beyond the vertical. This corresponds to an optimization angle that has already been determined for an automatic letter feed and a postage meter machine; (also see German PS 196 05 014 and German PS 196 05 015). The lower guide wall 3 is arranged orthogonally relative to the back guide all and, consequently, orthogonally relative to the front cover panel 2 as well. A defined letter position and a harmonic adaptation to the preceding and following devices are thus achieved. For example, the front cover panel is composed of plexiglass. The back end 8 of the lower guide wall 3 is adapted to the postage meter machine so that in the letter discharge of the scale, the letter A initially lies free during the departure of a (covered) conveyor belt. All these assemblies or parts are secured on a chassis by corresponding adaptors. A (covered) motor 29 has a resiliency that, in combination with the arrangement of the transport device 4 at the weighing pan 6, damps jolts and oscillations given heavy pieces of mail. For example, a d.c. motor of the type M42×15 Gefeg-Antriebstechnik is suitable.

Details about the design structure of the preferred dynamic scale employed can be derived from German PS 198 33 767, corresponding to U.S. Pat. No. 6,265,675. Of course, other known scales for letters to be horizontally transported or with some other type of conveyor device can be utilized in modified form for corresponding postage meter machines.

Figure 2:
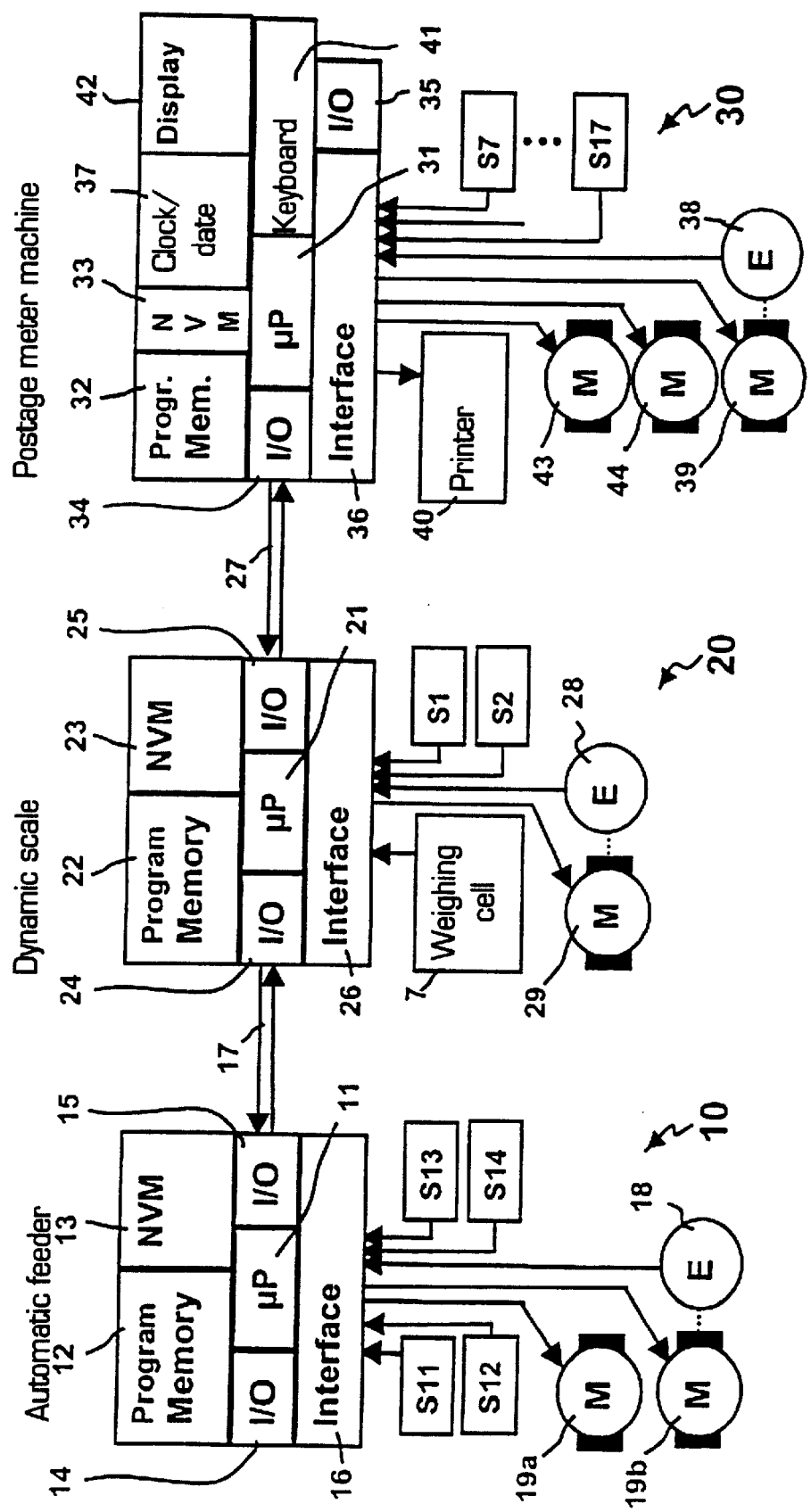
FIG. 2 is a block circuit diagram of a mail processing system constructed and operating in accordance with the invention.

The block circuit diagram of a mail processing system with a first processing station 10 (an automatic feeder here), a dynamic scale 20 and a further processing station 20 (a postage meter machine here) is explained on the basis of FIG. 2. The control unit of the automatic feeder has a microprocessor 11 that is connected to a program memory 12, to a non-volatile memory 13, an input interface 14 and an output interfaces 15, as well as to an interface 16 for the drive of motors 19a, 19b, and for interrogation of an encoder 18 and sensors S11, S12, S13, S14 for determining format and thickness. Details are disclosed in German OS 198 36 235 and in German Patent Applications 199 13 065, corresponding to U.S. application Ser. No. 09/528,421, filed Mar. 17, 2000 and 199 12 807, corresponding to U.S. application Ser. No. 09/524,233 filed Mar. 13, 2000. The sensor S11 of the automatic feeder serves for height measurement, the sensor S12 serves for thickness measurement and the sensors S13 and S14 serve for length measurement of a piece of mail transported in a standing or orientation.

The block circuit diagrams of the control of the automatic feeder 10 and the dynamic scale 20 are different only with respect to the connected sensors. The control unit of the dynamic scale 20 has a microprocessor 21 that is connected to a program memory 22, a non-volatile memory 23, an input interface 24 and an output interface 25 as well as to an interface 26 for the drive of a motor 29 of the conveyor device of the scale, and interrogation of an encoder 28, and the weighing cell 7 and the sensors S1, S2.

The further processing station 30 is a postage meter machine, preferably of the type JetMail®, and has a microprocessor 31 that is connected to program memory 32, a non-volatile memory 33, a clock/date module 37, an input interface 34 and an output interface 35 as well as to an interface 36. The latter serves for the drive of the printer 40, motors 39, 43, 44, and for interrogating sensors S7, S17 and further sensors (not shown) as well as an encoder 18, which is mechanically coupled to the motor 39.

For the input and output of data, the automatic feeder and the dynamic scale 20 are coupled via their interfaces 15 and 24, and the dynamic scale and the postage meter machine are coupled via their interfaces 25 and 34. At least one signal referenced to a format and at least one signal referenced to the thickness are communicated to the dynamic scale 20 and are forwarded from the scale 20 to, for example, the postage meter machine. As a result of an evaluation of the mail dimensions, the microprocessor 21 can generate appropriate control commands in order to switch from a first operating mode to a second operating mode of the dynamic scale 20, whereby corresponding parameters of the dynamic scale are set. The microprocessor 21 of the dynamic scale 20 determines the weight value and communicates this valve to the postage meter machine, which, using its microprocessor 31 or a separate postage calculator, determines a postage value therefrom that the printer 40 prints onto the piece of mail A. An arrangement for communication between a base station and further stations of a mail processing machine and for the emergency shut-off thereof is disclosed in German OS 197 11 997, corresponding to U.S. Pat. No. 6,178,470. For example, a postage meter machine of the Jet Mail® type can be the base station of the mail processing machine, as disclosed in detail by German OS 197 11 997.

Figure 4:
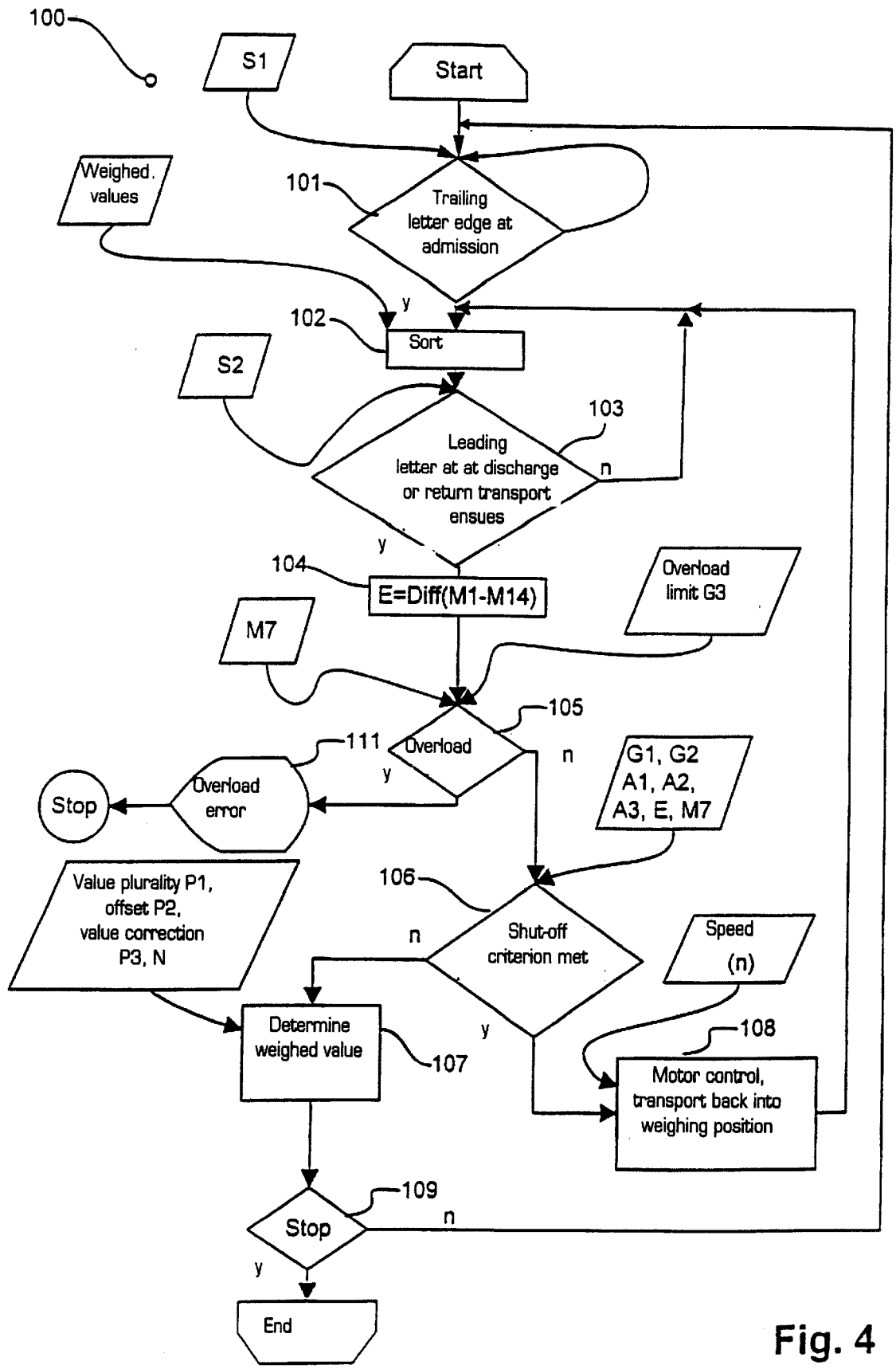
FIG. 4 is a partial flowchart for a dynamic weighing constructed and operating in accordance with the principles of the present invention.

For example, the automatic feeder communicates a respective value for the thickness and for the height as well as a switchover signal to the dynamic scale 20. In a first operating mode, dynamic scale 20 transports pieces of mail with a controllable transport device 4 to a further processing station with a first speed, with weighing by a weighing cell 7 during the transport, and with evaluation of the measured values with the microprocessor 21 for weight determination given dynamic weighing. A switch is made from the first operating mode to a second operating mode for static weighing dependent on the result of the dimension determination of the following piece of mail in the first processing station 10, arranged upstream in the stream of mail. The microprocessor 21 of the dynamic scale 20 interprets a lack of the switchover signal as retention of the first operating mode, dynamic weighing (FIG. 4). In the first mode, the piece of mail is transported downstream during dynamic weighing in the direction of the further processing station 30 with a first speed whose maximum value is limited by the operating speed of the further processing station 30 and whose reference value is stored in the non-volatile memory 23 in a set of parameters for the control of the dynamic scale 20.

The first processing station 10 is an automatic feeder with an arrangement for determining dimensions of print carriers according to German Patent Application 199 12 807. Measured values of the sensors for at least thickness, height and length of the pieces of mail A are interpreted in the evaluation circuit thereof. Preferably, the microprocessor 11 evaluates the measured values in the control unit of the automatic feeder on the basis of criteria stored in the non-volatile memory 13. The criteria can be entered into the non-volatile memory 13 of the automatic feeder via the keyboard 41 of the postage meter machine during the initialization. The microprocessor 11 is programmed with a program in the program memory 12 to generate a switchover signal when the probability for a successful static weighing is low. The switching to the second operating mode, dynamic weighing (FIG. 5), is determined dependent on the dimension of the piece of mail, whereby a first interpretation is undertaken by the microprocessor 11 of the first processing station and a switchover signal is communicated to the dynamic scale 20 when the values permitted for a dynamic weighing are exceeded by one of the dimensions, or with respect to a permitted thickness profile.

In the second operating mode, static weighing, the piece of mail is transported downstream in the direction of the further processing station 30 with a predetermined speed, is stopped and then statically weighed. The predetermined speed can be equal to a second speed or the first speed with which the piece of mail is transported given dynamic weighing. The reference value is stored in the non-volatile memory 23 in a parameter set for controlling the dynamic scale 20. As viewed in the direction of the mail stream, the dynamic scale 20 is the second processing station. When weighing, an interpretation of the weight measurement is implemented for weight determination, fore which purpose a number of parameter sets is offered in the memory 23 for the control of the dynamic scale 20 and for the interpretation of the weight measurement. In one version the parameter set is selected dependent on the dimension of the piece of mail. The parameter sets also differ, for example, in the shut-off criteria A1, A2, A3 required in the weight determination and in the limit values G1, G2, G3 for postal matter weights.

For a first evaluation, the data with respect to the dimension of the piece of mail are forwarded to the dynamic scale 20 via a first interface and are then forwarded in common with the identified weight data to the further processing station 30 via a second interface. The further processing station 30 has means for calculating postage. For example, a postage meter machine with an integrated postage computer is utilized to calculate the postage value dependent on the dimensions, the weight value and on other shipping parameters. The other parameters are preferably entered at the further processing station 30; for example, the shipping parameters are entered via the keyboard of the postage meter machine. The transport velocity for a dynamic weighing is also input into the non-volatile memory 23 of the scale via the keyboard of the postage meter machine. This input, however, ensues upon initialization of the scale. The non-volatile memory 23, for example an E$^2$PROM, contains machine-specific parameters and data for the control of the scale that have been acquired from empirical values of the manufacturer and are stored in table form. The microprocessor 21 processes input signals from sensors S1 and S2 and the data from the non-volatile memory 23 and generates the output signals for the motor 29 of the transport device dependent on the letter position and monitors the weight or implements a weight determination. The sensor S1, which is arranged upstream in the scale, serves as an entry sensor, and the downstream sensor S2 serves as exit sensor. For example, the sensor can be fashioned as a light barrier and has an integrated, known evaluation circuit that outputs digital signals to the microprocessor 21.

Via a driver in the interface 26, the microprocessor 21 drives the motor 29, which is coupled to an encoder 28. The microprocessor 21 is operationally connected to sensors S1, S2, the encoder 28 and the weighing cell 7 in order to receive sensor signals, encoder signals and weight data and in order to send control commands to the motor 29 of the transport device 4. The latter is preferably a d.c. motor 29 that is supplied with d.c. pulses, whereby a specific speed is set on the basis of the relationship of the pulse length to the pulse pause. In the operating mode for the dynamic operation of the scale, the transport device 4 implements a forward motion of the appertaining letter within the scale downstream with a specific speed. The speed does not exceed the transport speed in the further processing station 30. A micro-controller with integrated memory can be employed as an alternative to the microprocessor 21. The control unit can generate corresponding control commands with which the transport speed within the dynamic scale 20 can be set for the first operating mode. Also, the transport direction of the scale 20 can be reversed with the driver in the interface 28 connected between the drive and the control in order to position the letter A on the middle of the weighing pan 6 in one of the operating modes. The driver also can be fashioned as a relay that switches the voltage for the drive motor of the transport device 4. The motor 29 can be connected to a drive roller via a suitable transmission. The transmission can be a gear transmission or a belt transmission.

The specific weighing method employed in the weighing cell 7 is of no consequence. For example, the weighing cell 7 can have a wire strain gauge bridge with a connected evaluation circuit that emits digital weight data to the microprocessor 21. The weighing cell 7 is preferably of the type HBM PW 2G of the Hottinger Baldwin Messtechnik company. Given this type, an evaluation circuit is already integrated into the weighing cell. The evaluation circuit is in communication with the electrical output of the weighing cell 7 and its jobs include the calibration and smoothing of every measured value. A suitable weight value from the number of measured values can be communicated to the postage meter machine. A suitable method and an arrangement for determining a weight with a dynamic scale are disclosed in German Published Application 198 60 294. The program memory 22 of the dynamic scale 20 has a program for the evaluation of the measured values. The microprocessor ($\mu$P) 21 of the control unit of the dynamic scale 20 is programmed to communicate only a plausible measured value to the postage meter machine.

After editing the measured value in the scale 20, a weight class is assigned according to a postage table stored in a postage computer of the further processing station 30, and, finally, a postage value is assigned using the dimensions and further postal information such as shipping type, shipping destination, etc. The latter steps preferably are implemented in the microprocessor 31 of the postage meter machine, to which only the measured value is then transmitted. To this end, the microprocessor 21 of the dynamic scale is connected to the microprocessor 31 of the postage meter machine via the serial interface 25, via cable 27 and via the serial interface 34. An external user interface, for example the user interface of the postage meter machine, is preferably used for the input and display of the further postal information and of additional parameters into the scale. The user has only one keyboard 41 of the postage meter machine available that allows a modification of operating parameters and data that are preferably stored in the non-volatile memory 23 of the scale. Preferably, the display 42 of the postage meter machine is employed for the display of the scale parameter setting.

The franking imprint is carried out with the printer 40 that, for example, is arranged in the base of the postage meter machine JetMail® and advantageously has a digital print head, for example an ink jet print head. This enables the respectively newly calculated franking value to be printed without delay given mixed mail.

Figure 3:
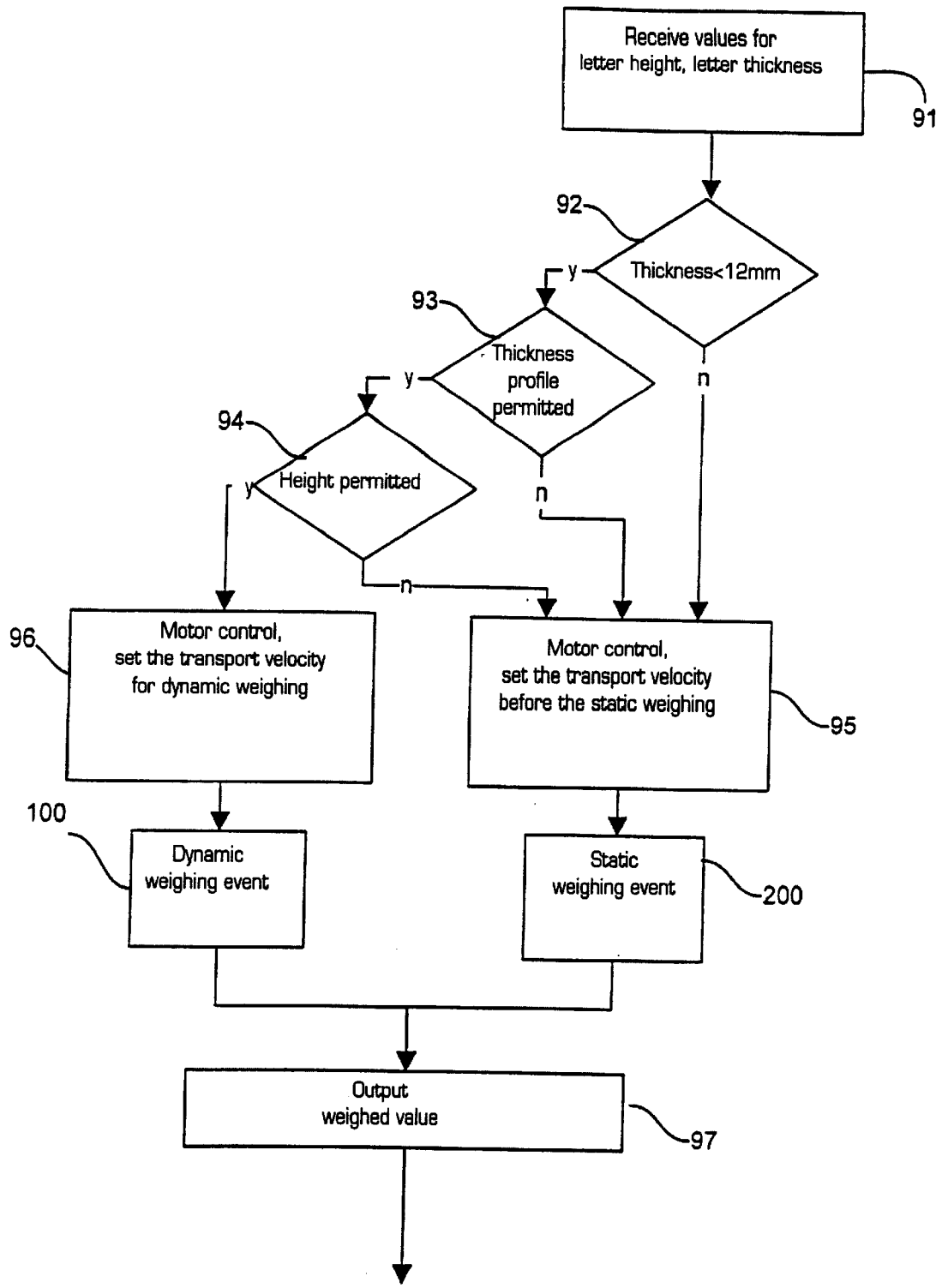
FIG. 3 is a flowchart for the control of the scale constructed and operating in accordance with the invention.

FIG. 3 shows a flowchart for the control of the scale 20 according to a further version. In a way that is not shown, the first processing station 10 monitors the maximum length of the piece of mail A and recognizes a backup, if present. The first processing station 10 (automatic feeder) supplies a value for the thickness and height of the piece of mail matter A to the dynamic scale 20 but not a switchover signal. The dynamic scale 20 has a measuring arrangement 4, 6 (FIG. 1) and 7, 21 (FIG. 2). The control thereof proceeds from a transport of piece of mail A with a controllable transport device 4 to the further processing station with a first speed, a measurement with a weighing cell 7 during the transport and an evaluation of the measured values with the microprocessor 21 for the weight determination. The scale 20 is switched from a first mode onto a second operating mode dependent on the result of the dimension determination of the piece of mail in the first processing station 10, arranged upstream in the mail stream, and on the result of the dimension determination in the scale 20.

In a step 91, the values for height and thickness are received and interpreted. A branch is then made to a first interrogation step 92 in order to check whether the thickness falls below a predetermined limit value. Then a branch is made to a second interrogation step 93 to check whether the thickness fluctuation lies within the framework of a permissible thickness profile. A branch is then made to a third interrogation step 94 in order to check whether the height lies in the permitted range. If this is the case, the first operating mode—dynamic weighing—is retained and branch is made via a step 96 to the sub-routine in the step 100. If this is not the case, i.e. the thickness and height or the thickness profile exhibit values that are not permitted, then a switch is made to the second operating mode 00 static weighing—and a branch is made via a step 95 to the sub-routine in the step 200. In step 95, the motor controller is then set for a transport speed with which a piece of mail A is to be transported until an optimum weighing position for the static weighing on the weighing pan 6 has been reached.

Alternatively, the values for a format of the postal matter can be received in the step 91, and a check can be carried out in the third interrogation step 94 to determine whether the values of the format lie in the permitted range.

In step 96, in contrast, the motor controller is set for a transport speed that was empirically determined for a successful dynamic weighing. After a successful weighing, an output of the weighed value ensues in step 97 to the following processing station, and a branch-back (not shown) ensues to the step 91.

The control unit 21 of the scale 20 thus generates a switchover signal before a weighing when a retention of a first operating mode (dynamic weighing) does not seem promising. In step 95, the motor controller can be initially set to the same transport speed with which a piece of mail A is transported in the dynamic weighing. During the course of step 200, the transport speed is then reduced to the value of zero, this having been achieved when the piece of mail A has assumed an optimum weighing position for the static weighing on the weighing pan 6.

FIG. 4 shows a partial flowchart 100 for a dynamic weighing. The microprocessor can identify the leading edge of the letter with the sensor S1 at the letter entry and starts the weight determination. The weighing cell 7 constantly supplies weighed measured values. The microprocessor has recognized the trailing letter edge (in step 101) with the sensor S1 at the letter entry and starts a sub-routine for sorting (in step 102). The sorting is implemented with the constantly newly supplied weighed values and the previous weighed values. After a certain time has passed, the microprocessor recognizes the leading edge of the letter (in step 103) with the sensor S2 at the letter exit 32. The time span that has elapsed for an acquisition of a predetermined (by the parameter P3) number of most recent measured values is referred to as measuring time range T1. The microprocessor now forms a decision parameter E in step 104 as a difference value between the sorted highest and lowest value and start the interrogation for at least one overload in step 105. The measured value M7 is compared to the highest overload limit value G3. If present, an overload error is evaluated further (in step 1110 and the scale is stopped. When there is no overload error, then a determination is made in a further interrogation step 106 as to whether the value is valid or invalid. A sub-routine is called for this purpose. The difference value E between the first M1 and the fourteenth sorted measured value M14 should lie within the range of one of the shut-off criteria A1, A2 or A3. For example, it lies within the range defined by the second shut-off criterion A2 and thus yields valid measured results. Since none of the shut-off criteria has been met, a branch can now be made to step 107 for the determination of the weighed value wherein a further subroutine is called. Otherwise, given invalid measured values, a branch is made to the step 108 where the motor controller is switched in order to initiate the return transport of the piece of mail into the weighing position and a re-weighing. The speed n is identified by the encoder 50 and can be controlled for the control of the speed. From step 108, a branch is then made back to the step 102 for the sorting. The possible branch to the re-weighing (step 108) now occurs practically hardly at all due to the invention. When the scale is stopped, which is queried in step 109, then a branch is made from the step 109 to the step 101. When a stop command has been recognized, the end of operation of the scale has been reached (step 110). The weight determination ensues in step 107. Given a successful weight determination, the weighed result is supplied to the postage meter machine. A more detailed presentation of the method for determining a weight with a dynamic scale can be derived from German Published Application 198 60 294.

Figure 5:
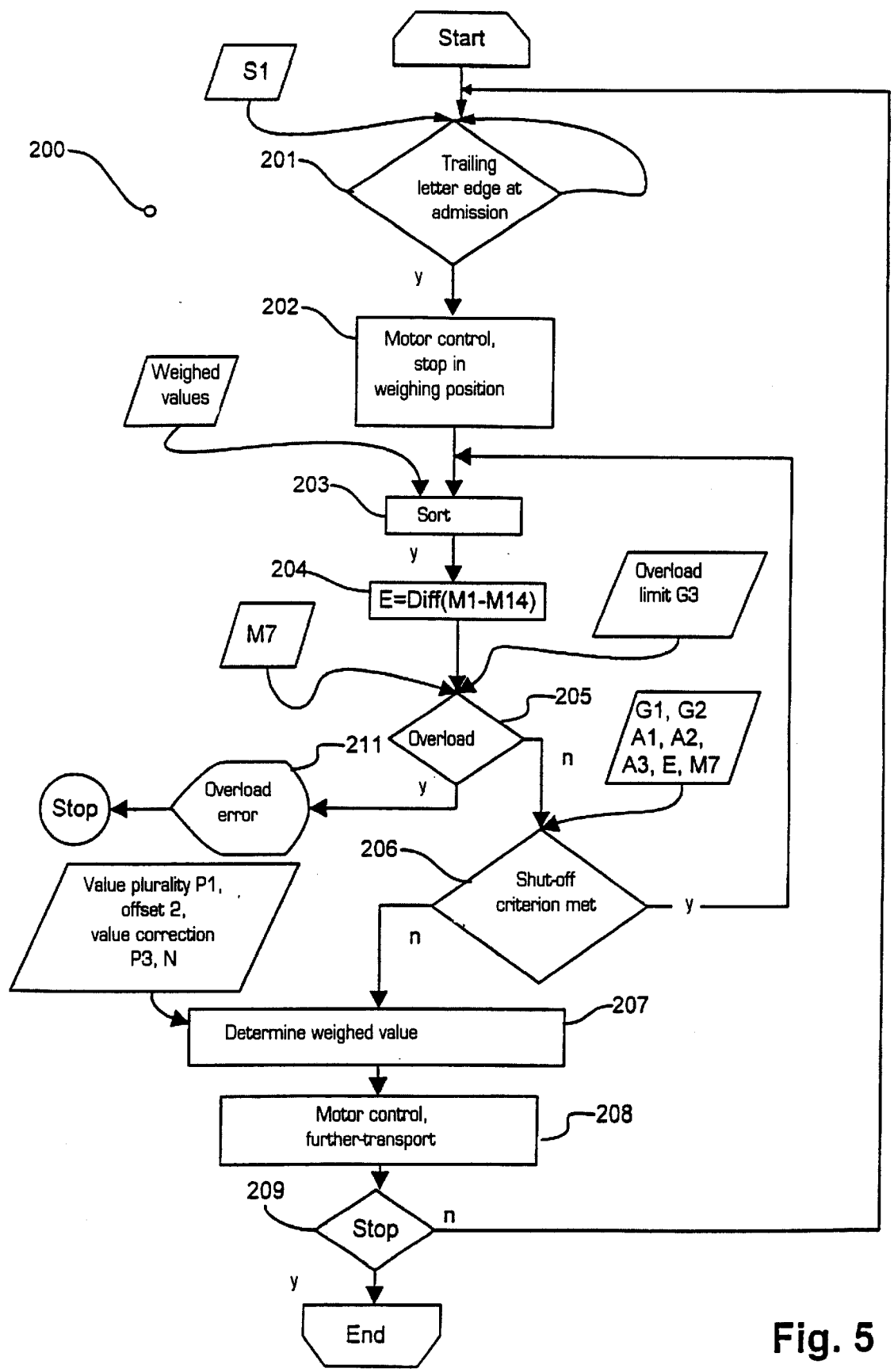
FIG. 5 is a partial flowchart for a static weighing constructed and operating in accordance with the invention.

FIG. 5 shows a partial flowchart 200 for a static weighing. The microprocessor can identify the leading edge of the letter with the sensor S1 at the letter entry and starts the weight determination. The weighing cell 7 constantly supplies weighed measured values. The microprocessor has recognized the trailing letter edge (in step 201) with the sensor S1 at the letter entry and waits for the weighing position to be reached. The motor is then switched to stop in the step 202. A sub-routine for sorting starts in step 203, this being implemented with constantly newly supplied weighed values and the previous weighed values. After a certain time has passed in the measuring time range T1, the microprocessor 21 forms a decision parameter E in step 204 as difference value between the sorted highest and lowest value and start the interrogation for at least one overload in step 205. The measured value M7 is compared to the highest overload limit value G3. If an overload error exists, it is evaluated further (in step 211) and the scale is stopped. When there is no overload error, then a determination is made in a further interrogation step 206 to see whether the value is valid or invalid. A sub-routine is called for this purpose. The difference value E between the first M1 and the fourteenth sorted measured value M14 should lie within the weight range of one of the shut-off criteria A1, A2 or A3. For example, it lies within the range defined by the second shut-off criterion A2 and thus yields valid measured results. Since none of the shut-off criteria has been met, a branch can now be made to step 207 for the determination of the weighed value wherein a further subroutine is called. Otherwise, given invalid measured values, a branch is made back to the step 203 where a re-weighing is implemented in the same weighing position. The successful determination of the weighed value leads to the handover of the weighed result to the postage meter machine and further-transport (in step 208) is initiated.

As long as the scale is not stopped (for example, manually)—which is interrogated in step 209—, then a branch is made from step 209 back to step 201. When a stop command is recognized, the end of the operation of the scale has been reached.

An automatic switching into the first operating mode for the dynamic weighing likewise ensues dependent on the result of the determination of the dimension of the following piece of mail in the first processing station 10 arranged upstream in the mail stream. The latter is preferably an automatic feeder.

However, some other first processing station 10 is also possible, for example an envelope stuffer (not shown), this being equipped with corresponding means for format and thickness determination.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for controlling a scale for weighing postal items, comprising the steps of:
   providing a scale operable in a first mode for dynamic weighing and a second mode for static weighing;
   in a processing station separated from said scale, determining a dimensional characteristic of a postal item;
   automatically setting said scale to operate in one of said first or second modes dependent on said dimensional characteristic;
   conveying said postal item from said processing station to said scale via a transport device; and
   weighing said postal item at said scale in said one of said first or second operating modes.

2. A method as claimed in claim 1 comprising selecting said dimensional characteristic from the group consisting of dimensions of said postal item and a thickness profile of said postal item.

3. A method as claimed in claim 1 comprising predetermining a maximum value for said dimensional characteristic for which dynamic weighing of said postal item is permissible, and automatically setting said scale to operate in said second mode if said processing station determines that said dimensional characteristic of said postal item exceeds said maximum value.

4. A method as claimed in claim 1 wherein the step of conveying said postal item, if said scale is set to operate in said second mode, conveying said postal item from said processing station to said scale at a predetermined speed via said transport device and stopping said postal item at said scale for statically weighing said postal item at said scale.

5. A method as claimed in claim 1 wherein said processing station is a first processing station and wherein said transport device conveys said postal items along a conveying direction, and comprising the additional steps of:
   disposing a second processing station for said postal items following said scale in said conveying direction; and
   conveying said postal item from said scale to said second processing station via said transport device after weighing said postal item at said scale.

6. A method as claimed in claim 5 wherein said processing station has a processing speed associated therewith, and comprising conveying said postal item from said scale to said second processing station at a conveying speed limited by said processing speed, regardless of whether said scale is in said first or second mode.

7. A method as claimed in claim 6 comprising providing a processor and a non-volatile memory at said scale, storing said processing speed in said non-volatile memory as a reference value, and controlling said conveying speed of said transport device from said scale to said second processing station by said processor using said reference value stored in said non-volatile memory.

8. A method as claimed in claim 5 wherein said second processing station has a processing speed associated therewith, and comprising the steps of:
   conveying said postal item from said scale to said second processing station at a first conveying speed limited by said processing speed if said scale is in said first operating mode; and
   conveying said postal item from said scale to said second processing station at a second conveying speed, different from said first processing speed, if said scale is in said second operating mode.

9. A method as claimed in claim 8 comprising providing a processor and a non-volatile memory at said scale, storing said processing speed and said second speed in said non-volatile memory, and controlling said transport device to convey said postal item from said scale to said second processing station by said microprocessor to convey said postal item at said first speed or said second speed dependent on whether said scale is in said first mode or said second mode.

10. A method as claimed in claim 5 comprising providing a microprocessor and a non-volatile memory at said scale, storing a plurality of parameter sets in said non-volatile memory, and said microprocessor selecting one of said parameter sets for controlling weighing of said postal item at said scale in said one of said first and second modes dependent on said dimensional characteristic.

11. A method as claimed in claim 10 comprising conveying said postal item from said scale to said second processing station via said transport device at a predetermined velocity set by said processor, and wherein said plurality of parameter sets contain respectively different values for said predetermined velocity.

12. A method as claimed in claim 10 comprising providing parameter sets as said plurality of parameter sets which respectively differ with regard to shut-off criteria dependent on weight limit values for said postal item.

13. A method as claimed in claim 1 comprising determining said dimensional characteristic of said postal item in a first processor in said processing station, controlling weighing of said postal item using a second processor at said scale, making a setting determination in said first processor dependent on said dimensional characteristic as to whether said scale should be set to operate in said first mode or said second mode, and transmitting said setting determination from said first processor to said second processor for causing said second processor to set said scale to operate in said one of said first or second operating modes.

14. A method as claimed in claim 1 comprising providing a processor at said scale for controlling weighing of said postal item at said scale, supplying said dimensional characteristic from said processing station to said processor at said scale, and determining in said processor at said scale whether said scale should be set to operate in said first mode or said second mode.

\* \* \* \* \*